United States Patent [19]
Conemac

[11] Patent Number: 6,008,925
[45] Date of Patent: *Dec. 28, 1999

[54] LIGHT BEAM SCANNING APPARATUS AND METHOD

[75] Inventor: Donald C. Conemac, Moorpark, Calif.

[73] Assignee: Advanced Laser Technologies, Inc., Carpinteria, Calif.

[*] Notice: This patent is subject to a terminal disclaimer.

[21] Appl. No.: 08/887,947

[22] Filed: Jul. 3, 1997

Related U.S. Application Data

[63] Continuation of application No. 08/162,043, Feb. 2, 1994, Pat. No. 5,646,766, and a continuation-in-part of application No. 07/711,757, Jun. 7, 1991, Pat. No. 5,166,944.

[51] Int. Cl.⁶ .............................. G02B 26/08; H01S 3/10
[52] U.S. Cl. .......................... 359/204; 359/216; 359/196; 372/24
[58] Field of Search ..................... 359/204, 216, 359/217, 218, 219, 220; 347/233, 234, 243, 259, 260

[56] References Cited

U.S. PATENT DOCUMENTS

| | | | |
|---|---|---|---|
| 3,507,984 | 4/1970 | Stavis | 178/5.4 |
| 3,549,800 | 12/1970 | Baker | 178/7.3 |
| 3,571,493 | 3/1971 | Baker et al. | 178/5.2 |
| 3,621,133 | 11/1971 | Baker et al. | 178/7.3 |
| 3,636,251 | 1/1972 | Daly et al. | 178/6.6 B |
| 3,721,756 | 3/1973 | Baker | 178/6 |
| 3,727,001 | 4/1973 | Gottlieb | 178/7.3 D |
| 3,737,573 | 6/1973 | Kessler | 178/7.5 D |
| 3,818,129 | 6/1974 | Yamamoto | 178/7.3 D |
| 3,944,323 | 3/1976 | Starkweather | 359/216 |
| 3,958,863 | 5/1976 | Isaacs et al. | 350/161 |
| 3,977,770 | 8/1976 | Isaacs et al. | 350/161 |
| 3,994,569 | 11/1976 | Isaacs et al. | 350/161 |
| 4,110,014 | 8/1978 | Yevick | 350/342 |
| 4,321,564 | 3/1982 | Tregay | 332/7.51 |
| 4,380,023 | 4/1983 | Mir et al. | 358/75 |
| 4,474,422 | 10/1984 | Kitamura | 350/6.8 |
| 4,578,688 | 3/1986 | Okuno | 346/157 |

(List continued on next page.)

FOREIGN PATENT DOCUMENTS

| | | | |
|---|---|---|---|
| 2577371 | 8/1986 | France | H04N 5/74 |
| 2252472 | 8/1992 | United Kingdom | H04N 9/31 |
| WO 90/13158 | 11/1990 | WIPO | H01S 3/07 |

OTHER PUBLICATIONS

Taneda, et al., High–Quality Laser Color Television Display, Journal of the Society of Motion Pictures and Television Engineers, vol. 82, No. 6, pp. 470–474 (1973).

Taneda, et l., A 1125–Scanning–Line Laser Color–TV Display, SID International Symposium and Expedition, pp. 86–89 (1973).

Yamamoto, et al., Lase Displays, Advanced and Image Pick–Up and Display, Academic Press, Inc., vol. 2, pp. 1–63 (1975).

Glenn, Displays, High Definition Television and Lasers, SID International Symposium and Expedition (1993), 3 pages.

*Primary Examiner*—Cassandra Spyrou
*Assistant Examiner*—Audrey Chang
*Attorney, Agent, or Firm*—Graham & James LLP

[57] ABSTRACT

A light beam scanning apparatus employs a movable reflector (32) having a large number of flat reflective sides (44) and a deflector (16) which shifts the light beam (10) at high speed across a plurality of the reflective sides (44). The movement of the reflector (32) is synchronized with the deflection of the light beam (10) to produce a desired scan pattern in a first scan direction (X). The reflective sides (44) of the movable reflector (32) may be angled relative to each other in a second direction (Y) to produce different scan lines thereby providing an X-Y scan pattern. The combined high speed beam deflection and motion of the reflector (32) provide scanning of the beam (10) in parallel scan segments thereby providing high scanning speed of the beam (10) with a high degree of resolution.

3 Claims, 8 Drawing Sheets

U.S. PATENT DOCUMENTS

| | | | |
|---|---|---|---|
| 4,591,903 | 5/1986 | Kawamura et al. | 358/75 |
| 4,720,747 | 1/1988 | Crowley | 358/231 |
| 4,851,918 | 7/1989 | Crowley | 358/231 |
| 4,930,849 | 6/1990 | Tanaka | 350/6.6 |
| 5,026,133 | 6/1991 | Roddy et al. | 350/6.4 |
| 5,166,704 | 11/1992 | Yasuda | 346/108 |
| 5,317,348 | 5/1994 | Knize | 353/31 |
| 5,351,070 | 9/1994 | Hinton et al. | 346/108 |
| 5,534,950 | 7/1996 | Hargis et al. | 348/758 |
| 5,646,766 | 7/1997 | Conemac | 359/204 |

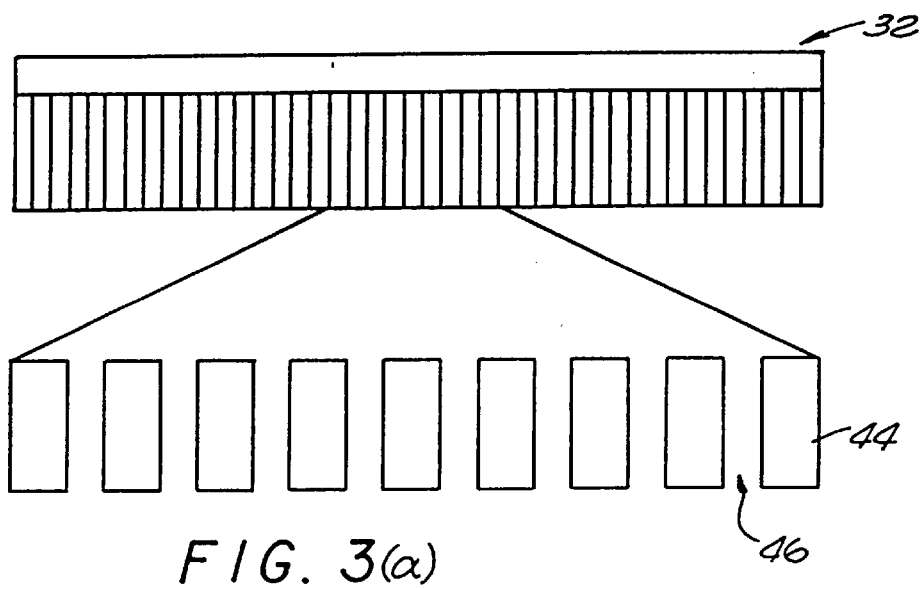
FIG. 3(a)
FIG. 3(b)
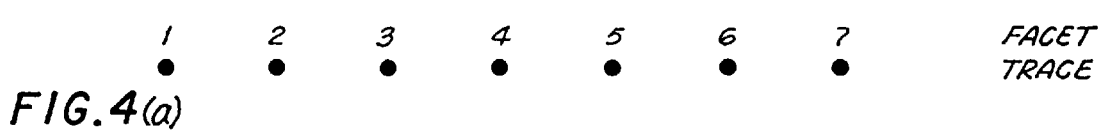
FIG. 4(a)
FIG. 4(b)
FIG. 4(c)
SCANNING DIRECTION

LIGHT BEAM SCANNING APPARATUS AND METHOD

RELATED APPLICATION INFORMATION

This application is a continuation of U.S. Ser. No. 08/162,043 filed on Feb. 2, 1994, U.S. Pat. No. 5,646,766 which application was a continuation-in-part of U.S. Ser. No. 07/711,757 filed on Jun. 7, 1991, U.S. Pat. No. 5,166,944.

BACKGROUND OF THE INVENTION

1. Field of the Invention

The present invention relates to methods and apparatus for scanning a light beam in one or more directions.

2. Description of the Prior Art and Related Information

In a wide variety of applications, it is necessary to scan a light beam along one or more directions, accurately and at high speed. For example, in laser printers, optical disc read/write systems, laser based displays, laser imaging, laser phototypesetting, fiber optic networking systems and a wide variety of other applications, such high speed and accurate scanning of the laser beam is critical. The conventional approach to scanning a laser beam for many such applications employs a rotating nirror to scan the laser beam in a linear direction as the mirror rotates. Typically, the mirror is configured in a polygon shape with each side corresponding to one scan length of the laser beam in the linear direction.

An example of such a rotating polygon laser beam scanner is illustrated in FIG. 1. The prior art laser beam scanning apparatus shown in FIG. 1 employs a polygon shaped mirror 1 which receives a laser beam provided by laser 2 and deflects the laser beam in a scanning direction X as the polygon 1 rotates. It will be readily appreciated from inspection of the geometry of FIG. 1 that such a rotating polygon system has the ability to scan the laser beam through a maximum angle of 180° with a scan line duration determined by the rotational speed of the polygon divided by N, where N is the number of polygon ides. Also, it will be appreciated that for large N the scan angle may be significantly reduced below 180°. Thus, for the eight sided polygon configured as illustrated in FIG. 1, the laser beam is scanned through an angle of about 90° with the duration of each scan line being ⅛ the period for one rotation of the polygon.

The laser scanning apparatus illustrated in FIG. 1 has the advantage of being quite simple, and is suitable for some applications. Nonetheless, the inherent limitations of such apparatus make it impossible to simultaneously achieve a high degree of resolution, high scanning speed and a large scanning angle. More specifically, a high degree of resolution requires a relatively large polygon with few sides. That is, if the laser beam is to provide accurate information as it is scanned along the scan direction, modulation of the laser beam as it traverses the surface of the polygon side must unambiguously provide discrete points in the scan direction. Thus, each side of the polygon must increase with the beam diameter and the number of discrete scan points (n). Therefore, high resolution, corresponding to a very large number (n) of discrete scan points, in general requires large polygon sides. This limitation is particularly significant where the scanned beam target surface is located close to the polygon mirror. Also, as noted above, the scan angle is reduced as the number of polygon sides is increased. Therefore, high resolution and high scan angle require a large polygon with relatively few sides.

The requirements of a large polygon with few sides, however, mitigate against a high scan rate. As indicated above, scanning speed is directly related to the number of polygon sides. Therefore, a polygon with few sides requires very high speed rotation to achieve high scanning speed. Rotating a large polygon at high speed creates mechanical problems, however. In particular, high speed rotation introduces vibrations, stress on the moving parts, and reduced accuracy in the registration of the mirror relative to the laser beam. These factors collectively limit the rotational speed of the mirror, and hence the beam scan rate. Also, the requirement of a large polygon mirror can create severe space problems in compact applications such as laser printers, optical disc read/write devices and other applications where space considerations are important.

Accordingly, it will be appreciated that the conventional laser beam scanning apparatus illustrated in FIG. 1 has inherent limitations on its performance capabilities which make it unsuitable for applications where high speed scanning as well as high resolution and accuracy are required or where space limitations are present. A need thus presently exists for an improved laser beam scanning apparatus.

DISCLOSURE OF THE INVENTION

The present invention provides an apparatus and method for scanning a light beam through a large scan angle at high speed and with a high degree of accuracy. The present invention further provides a light beam scanning apparatus having a relatively compact configuration even where high resolution is required and which is relatively free of vibration or other mechanical problems even at high scan speeds.

In a preferred embodiment, the present invention employs a reflector, having a number of flat reflective surfaces, configured so as to intercept one or more laser beams on one of the reflector surfaces. For example, the reflector may take the form of a wheel having a large number of highly reflective sides or facets disposed along the circumference thereof. The facets preferably have a width approximately equal to the laser beam diameter and are spaced apart. The reflector is coupled to a mechanism for moving the reflector so that successive ones of the reflective surfaces intercept the laser beam. For example, the wheel shaped reflector may be coupled to a motor which rotates the wheel so as to move successive facets into reflective contact with the laser beams. Disposed in the optical path between the laser beam and the reflector, is a deflector which shifts the laser beam relative to the facets. The deflector may preferably be an acousto-optic or piezoelectric deflector module which can deflect the laser beam with a very fast response time. The amount of deflection of the beam and the facet size determine the number of facets of the reflector which are hit as the beam is swept across the reflector. A control system synchronizes the laser beam deflection with the motion of the movable reflector so that the deflector and moveable reflector together scan the laser beam in a desired direction. An encoder is employed to determine the position of the reflector to allow synchronization with the deflector through the control system. For most applications a beam modulator will also be employed to modulate the beam to provide on/off or intensity modulation of the beam during scanning in response to a data signal.

The number of facets hit as the beam is deflected, and the relative speed of the deflector and the reflector, may be chosen to provide several different scan patterns. For example, deflecting the beam over a number of facets will cause the laser beam to scan in a linear direction in discrete segments equal to the number of facets over which the beam is deflected. The discrete scan segments are in turn filled in by subsequent deflector cycles as the reflector rotates through an angle equal to one facet length. Due to the very fast cycle time which may be achieved by the deflector, a very large number of distinct scan points may be provided in each scan segment. Alternatively, deflection of the laser beam may be synchronized with the reflector motion so the beam is constrained to remain on a single facet as the facet rotates with the reflector. This will cause the laser beam to scan in a continuous manner across the linear direction. Other scanning patterns may also be created using different relative synchronization between the deflector and the moving reflector facets.

The specific combination of scan pattern, reflector size and number and size of facets may be chosen for the specific application so as to provide an optimal combination of scanning speed, scan angle and resolution. For example, where a relatively large scan angle is desired with good resolution and moderate to high scan rates, a relatively small reflector may be employed having few facets, with the deflector synchronized to maintain the laser beam on a single facet. Since the beam is moved with the facet, the scan angle may be very large, up to 180° or greater, even though the reflector is kept small. This enables high speed rotation of the reflector without introducing mechanical vibrations or other problems related to rotation of a large reflector. For even higher speed scanning, the deflector preferably shifts the beam over a number of facets so as to scan the beam in discrete segments across the scan direction. These scan segments, equal in number to the number of facets, allow the full scan angle to be scanned almost in parallel. The scan rate may be much higher in such a system due to the extremely fast response time of the deflector and since the reflector need only rotate through a fraction of the full scan angle for each scan. Some additional complexity is introduced into the control electronics, however, to allow the data used to modulate the laser beam to be correctly synchronized with the segmented scan pattern. For example, a data buffer and serial to parallel converter may be employed to store data for an entire scan line and then provide the data to the beam modulator in segments corresponding to the scan pattern.

Accordingly, it will be appreciated that the present invention provides a laser beam scanning apparatus having the capability to provide large scan angles and high scan rate, along with high resolution, without introducing vibration or other related mechanical problems.

The present invention may further provide scanning in a second direction so as to make an X-Y scan pattern. In a preferred embodiment, the discrete facets of the reflector may be angled at different directions to a second scan direction. Each of these different angle facets thus corresponds to a different scan line as the reflector is moved relative to the laser beam. The deflector in turn shifts the laser beam to the different facets at high speed so that the different scan lines can be scanned almost in parallel. As in the case of the single scanning direction, the choice of synchronization between the laser beam deflector and the movement of the reflector determines the specific scan pattern in the X-Y plane. Alternatively, a second acoustical optical modulator deflector may be employed to fine adjust each line.

Thus, the present invention provides high speed X-Y scanning with either a conventional raster scan pattern or one of a variety of other scan patterns designed to optimize scan speed, resolution and scanning solid angle.

Further features and advantages of the present invention will be appreciated upon review of the following detailed description of the invention.

BRIEF DESCRIPTION OF THE DRAWINGS

FIG. 3($a$) and FIG. 3($b$) are expanded and side schematic views, respectively, illustrating the reflective surfaces employed in the reflector of the present invention.

FIGS. 4($a$)–4($d$) are drawings illustrating the different laser beam scan patterns obtainable by the laser beam scanning apparatus of the present invention.

DETAILED DESCRIPTION OF THE INVENTION

Figure 2:
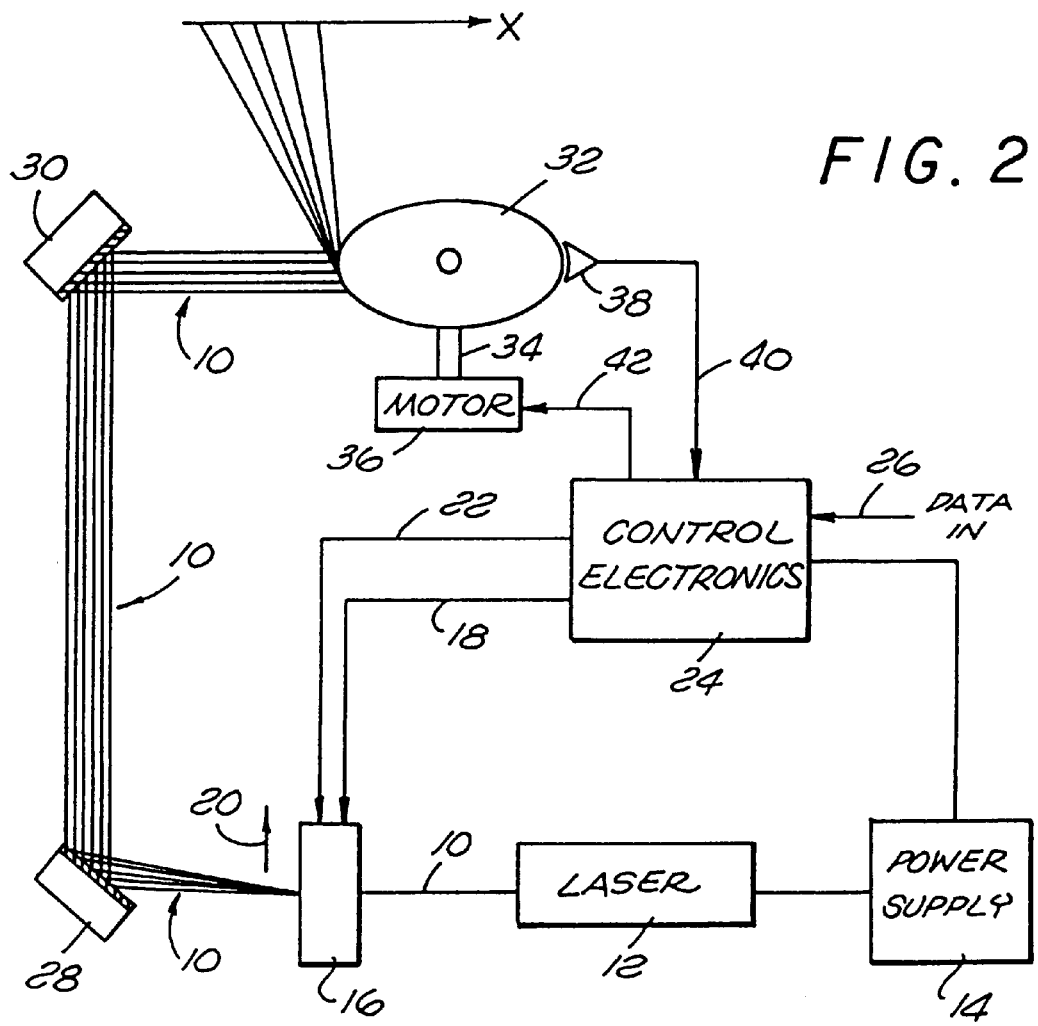
FIG. 2 is a combined top view/schematic drawing of a preferred embodiment of the laser beam scanning apparatus of the present invention.

Referring to FIG. 2, a preferred embodiment of the laser beam scanning apparatus of the present invention is illustrated.

As shown in FIG. 2, a laser beam 10 is provided from a laser 12. Laser 12 may be any of a large number of conventional commercially available lasers, with a power and beam characteristics determined by the specific application. For example, for compact low power applications, the laser 12 may be a semiconductor laser. For high power applications, a variety of other lasers are available such as gas lasers, including $CO_2$, krypton or argon lasers and solid state lasers, including riby, Nd:Yag or Nd:glass lasers, for example. Also, laser 12 may be pulsed or continuous depending on the application and the power requirements. As shown in FIG. 2, the laser 12 is coupled to a conventional power supply 14 which in turn may be coupled to a conventional power supply (not shown).

Laser beam 10 is provided from laser 12 to modulator/deflector 16. The modulator/deflector 16 serves the dual function of modulating the laser beam 10 in response to a data signal provided along line 18 as well as shifting the laser beam 10 in the direction of arrow 20 in response to a control signal provided along line 22. As will be discussed in more detail in relation to FIG. 6 below, the data signal provided along line 18 and the control signal provided along line 22 are provided from control electronics module 24 which in turn receives an externally provided data signal along line 26. In some applications, however, the data signal provided along line 18 and the modulator function of modulator/deflector 16 may be dispensed with. Such applications would include those for which the laser beam 10 is provided solely for illumination purposes and is not used to provide pixel or other information along the beam scan direction. Such applications may include the provision of an optical disc read laser, laser illumination of objects and other like applications. In a majority of applications, however, the modulator/deflector 16 will modulate the laser beam either in an on/off manner or will modulate the intensity of the beam to create an information pattern in the laser beam as it is scanned. Additionally, the modulator/deflector 16 may provide a slight deflection in a second Y direction to correct for nonlinearities at the extreme ends of the scan line.

The modulator/deflector 16 may preferably be a commercially available acousto-optic or piezoelectric crystal based optical modulator. These devices are particularly suitable since they have a very fast response time, which, as will be appreciated from the discussion below, allows a very high scanning rate for the laser beam. Suitable acousto-optic modulators are commercially available from Isomet Corporation; for example, the Isomet model 1206C modulator/deflector and D323B optic driver together provide 1° of laser beam deflection with a 20 ns cycle time.

Alternatively, separate modulator and deflector devices may be employed with a conventional modulator being combined with an electromechanical deflector having a high speed shifting capability for the laser beam.

The laser beam 10, which is shifted in the direction of arrow 20 as indicated by the four parallel lines, is provided to first and second mirrors 28, 30 respectively, which allow the optical path of the laser beam 10 to be lengthened in a compact configuration. This lengthening of the optical path allows a relatively small angle of shifting provided by miodulator/deflector 16 to translate into a relatively wide spatial shift of the beam 10 after reflection from mirror 30. In applications where the space limitations are not severe, however, the optical path may be suitably long without employing mirrors 28, 30 or, alternatively, a suitable spatial deflection of the beam may be achieved through other optical paths and combinations of reflectors. The reflected beam 10 provided from mirror 30 in turn is directed onto a movable reflector 32.

As illustrated in perspective view in FIG. 2 and in more detail in FIGS. 3(a) and 3(b), reflector 32 may preferably take the form of a rotatable wheel having a plurality of flat sided reflectors along the circumference thereof. The dimensions of the reflector 32 are not shown to scale in FIG. 2, and the specific dimensions of reflector 32 will depend upon the specific application. The wheel shaped reflector 32 is preferably coupled through hub and spindle 34 to a variable speed motor 36. Motor 36 provides for high speed rotation of the reflector 32 such that successive flat sided reflective facets on the circumference thereof are brought into reflective contact with the laser beam 10. The rotational speed of the reflector 32 is monitored by an encoder 38 which in turn provides a signal along line 40 to the control electronics 24. The encoder signal is used to determine the rotational speed of the reflector 32 and provide a control signal along line 42 to motor 36. Encoder 38 may take the form of a semiconductor diode laser and optical detector which detects passage of each consecutive reflective facet beneath encoder 38 and provides the resulting signal along line 40 to control electronics 24. Alternatively, a mechanical or electromechanical encoder 38 may be used to derive a signal from the motor 36 or spindle 34.

Although a wheel shaped multi-faceted reflector 32 is preferably preferred, it will be appreciated that other forms of movable multi-sided reflectors may also be employed to consecutively bring reflective flat surfaces in reflective contact with laser beam 10. Such alternate reflectors may be actuated by any number of a wide variety of electromechanical actuator systems, including linear and rotational motors, with a specific actuator system, chosen to provide the desired speed of the facets relative to the laser beam 10 for the specific application.

As will be described in more detail below, the deflection of laser beam 10 by the modulator/deflector 16 relative to the reflective facets of reflector 32 and the movement of the reflective facets of reflector 32 together cause the laser beam 10 to be scanned in the X direction as indicated by the arrow in FIG. 2. Furthermore, the control electronics 24 may synchronize the relative shifting speed of the modulator/deflector 16 and the speed at which movable reflector 32 brings successive reflective facets into reflective contact with laser beam 10, to provide different scanning patterns in the X direction. Also, by adjusting the amount of deflection of beam 10 and the length of the optical path between modulator/deflector 16 and movable reflector 32, the number of facets over which the beam is shifted can be controlled. This allows further control of the scan pattern in the X direction. Also, by providing different ones of the facets of movable reflector 32 at different angles relative to a second Y direction, consecutive scans along the X direction need not be overlapping and may produce scan lines spaced apart in the Y direction. This thus provides the capability to provide an X-Y scan pattern merely by suitably adjusting the relative angles of certain of the facets of reflector 32. As will be described in more detail below, this also can be chosen to provide various X-Y scan patterns, including a conventional raster scan pattern or more complex scan patterns.

Referring to FIGS. 3(a) and 3(b), the reflector 32 is illustrated in more detail showing the individual flat reflective facets on the circumference thereof. In FIG. 3(a), a front view of the circumference of the reflector 32 is shown in an expanded view. As shown, the circumference of reflector 32 preferably includes a large number of flat, optically isolated, reflective surfaces 44. As will be discussed in more detail below, the provision of such large numbers of facets allows very rapid scanning of very large numbers of horizontal lines. The reflective surfaces, or facets, 44 may preferably be formed by vapor deposition of a reflective material such as Al, Ag, Ni, or other suitable reflective material, in a desired pattern by use of a mask. Alternatively, the reflective facets 44 may be deposited and then the discrete spacings between the facets 46 etched away by a suitable mechanical or chemical etching process. The width of facets 44 is preferably chosen to be slightly larger than one beam diameter. The spacings 46 between the facets should be chosen to adequately optically isolate each of the reflective facets 44. This will in turn require spacings 46 to be approximately one laser beam diameter or smaller. Since the reflective facets 44 are arranged about the circumference of the curved reflector 32, it will be appreciated that the normals to the flat surfaces extend at different angles relative to each other along the X direction. The specific number of reflective facets 44, and the angular separation of the facets may be chosen for the specific application so as to provide a desired scan line duration and resolution. A number of specific examples of such facet sizes and spacings will be described below in relation to Tables 1–2.

Referring to FIG. 3(b), a schematic side view is shown of a portion of the reflector 32 for a preferred embodiment wherein the individual reflective facets 44 are angled relative to each other in a second Y direction. In this embodiment of the present invention, scanning of the laser beam in an X-Y plane may be achieved within the basic relatively simple apparatus illustrated in FIG. 2. More specifically, by virtue of the reflective facets 44 having differing nonnull angles in the Y direction, it will be seen that the beam will be scanned in discrete lines spaced in the Y direction with each line being dictated by the angle of the respective facet. Therefore, the number of facets having distinct angles in the Y direction will be chosen to be equal to the desired number of scan lines spaced in the Y direction. Preferably, the angular difference between consecutive facets will be chosen to give equal spacing along the Y direction. As will be discussed below, the arrangement of the angled facets around the circumference of the reflector can be chosen in conjunction with synchronization and the shifting of the laser beam to provide different X-Y scan patterns. Such X-Y patterns may include a conventional raster scan pattern or a unique parallel scan pattern.

Referring to FIGS. 4(a)–4(c), three distinct horizontal scan patterns which may be provided by the laser beam scanning apparatus of the present invention are illustrated. In these figures, the laser beam trace provided on the target surface is illustrated along with the facet number which the laser beam is in contact with for the specific trace being indicated. The drawings of FIGS. 4(a)–4(c) assume that the target is a flat screen with the laser beam being scanned linearly in the X direction. Also, the illustrations in FIGS. 4(a)–4(c) assume a laser beam diameter approximately equal to the reflective facet width with the individual facets being optically decoupled.

Referring to FIG. 4(a), the scan pattern is illustrated for the mode of operation in which the reflector 32 (referring to FIG. 2) is held stationery and the modulator/deflector 16 shifts the laser beam across the reflector 32 so as to consecutively hit seven reflective facets. As may be seen from FIG. 4(a), the resulting pattern is essentially seven discrete spots or pixels equally spaced along the entire scan direction. The scan angle which the scan line illustrated in FIG. 4(a) subtends will depend upon the relative angles of the facets 1 and 7 to each other in the X direction. The scan angle may reach 180° if the total angle between these facets is 45°. Greater than 180° of scan angle may also be achieved if the deflector scans the beam over facets with greater than 45° of relative angle. Such a large scan angle might be used for X direction scanning of a curved target surface or illumination of objects. While seven discrete scan points are illustrated in FIG. 4(a), it will be appreciated that a much larger number may be equally provided with seven only being presented for convenience of illustration.

Due to the very fast response time provided by commercially available solid state laser beam deflectors, the scan rate for the pattern illustrated in FIG. 4(a) may be very high. For example, as noted above, commercially available solid state modulators/deflectors can achieve a response time of approximately 2 nanoseconds (ns) per deflector cycle, leading to a corresponding scan line time for the pattern of FIG. 4(a). Nonetheless, due to the inherent limitations on the number of facets which may be provided, the number of dots of resolution for the scan pattern of FIG. 4(a) is inherently limited. Accordingly, the scan pattern of FIG. 4(a) is not a presently preferred mode of operation of the laser beam scanning apparatus of the present invention for most applications requiring relatively high resolution.

Referring to FIG. 4(b), an alternate scan pattern is illustrated corresponding to a second mode of operation of the laser beam scanning apparatus of the present invention. In the mode of operation of FIG. 4(b), the reflector 32 is rotated as the laser beam is swept across successive facets thereof by the modulator/deflector 16. In this mode of operation, the modulator/deflector 16 is adjusted so as to sweep the beam at a much faster rate than the angular speed of the reflector 32. In this mode of operation, the horizontal scan line is "filled in" by the consecutive sweeping of the beam across the facets as the reflector rotates.

Figure 1:
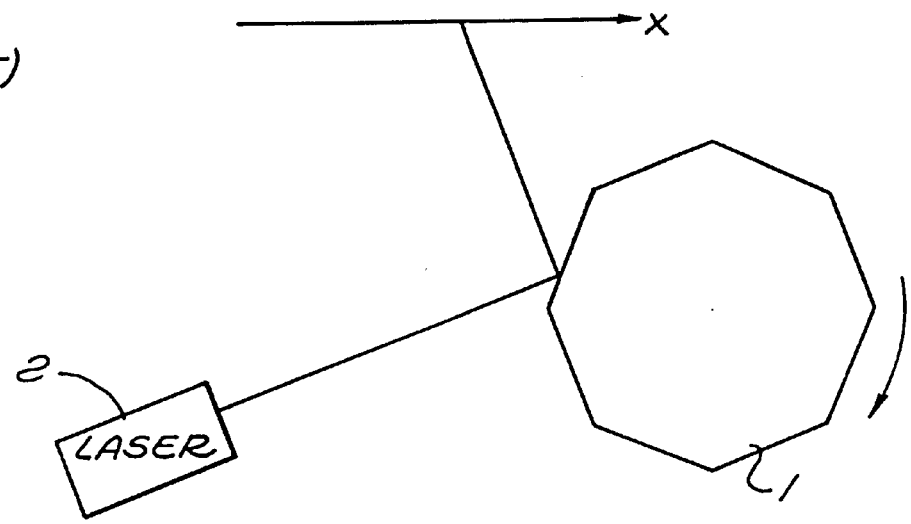
FIG. 1 is a top view of a prior art laser scanning apparatus.

More specifically, in FIG. 4(b) the second and third cycles of the deflector across the facets 1–7 are illustrated by the primed facet numbers. As may be appreciated from the resulting pattern, as the deflector sweeps the laser beam across the seven facets, the reflector 32 rotates slightly so that when the second cycle of the deflector returns the beam to facet number 1, the laser beam trace is now at position 1'. Similarly, the beam is swept to consecutive positions 2', 3'–7', as shown in FIG. 4(b). In this manner, through consecutive cycles of the deflector, the entire horizontal line will be scanned out in a parallel manner to make a continuous horizontal line with high resolution. The entire horizontal scan line is thus scanned out in a time period corresponding to a revolution of the reflector through the angle separating scan points 1 and 2. In other words, the angle through which the reflector must rotate, and hence the scan duration for a given polygon speed, has been reduced to 1/7 that required for a conventional rotating mirror such as illustrated in FIG. 1. It will be readily appreciated that as the number of facets swept by the deflector are increased, even more significant increases in scan speed may be obtained.

If the laser beam signal is modulated to provide pixel or other information while the beam is scanned along the X direction, the scan pattern of FIG. 4(b) will require a serial to parallel conversion of the data so that the scanning of the seven segments can occur in parallel in accordance with the pattern of FIG. 4(b). While this entails some additional complexity to the control system over a conventional horizontal scanning system, the significant increases in speed and resolution provided nonetheless make this a preferred mode of operation for applications requiring high speed scanning through a wide scan angle.

Referring to FIG. 4(c), a laser beam scan pattern is illustrated corresponding to a third mode of operation of the laser beam scanning apparatus of the present invention. As illustrated in FIG. 4(c) by the single line corresponding to a single facet 1, the mode of operation of FIG. 4(c) maintains the laser beam on a single facet throughout the scan line. This is achieved by synchronizing the speed of the deflector to be equal to that of the reflector 32. This implementation of the present invention requires the reflector to move through the entire angular range desired to be scanned, and thus scanning speed is reduced relative to the mode of operation of FIG. 4(b). The continuous scanning of the beam across the horizontal direction obviates the need for any buffering of the modulation data, however, and hence provides reduced complexity to the control system. Furthermore, in relation to a conventional system such as illustrated in FIG. 1, significant advantages are provided in that a very small reflector 32 may be employed since the laser beam does not traverse a reflective surface as it is scanned. Hence, the size of the reflector does not place any limitations on the resolution provided in the scan direction. Accordingly, the above-noted mechanical problems relative to the rotation of a large polygon are obviated by the present invention, allowing high speed rotation and higher scanning when operating in the mode illustrated by FIG. 4(c).

Figure 5A:
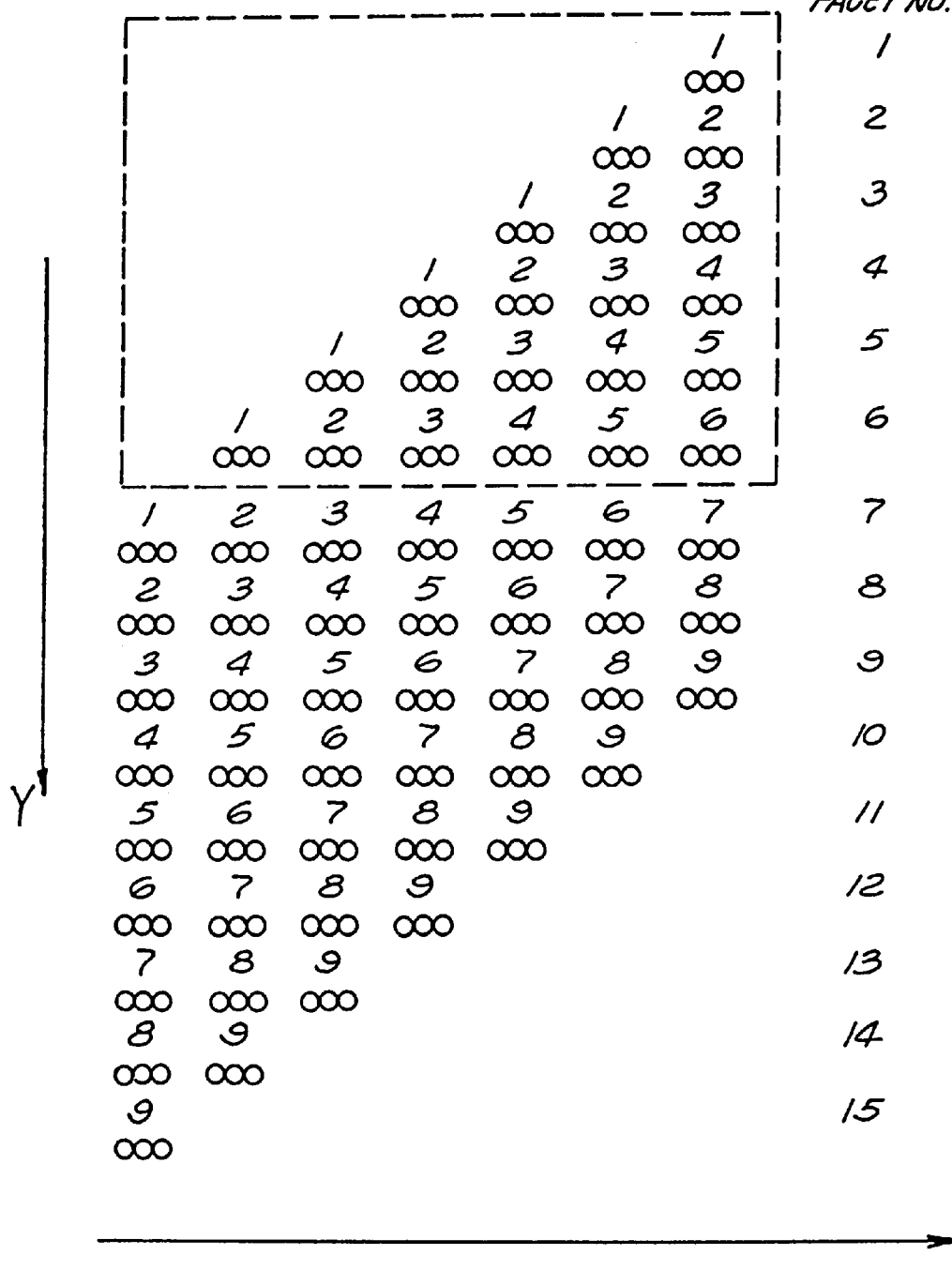
FIGS. 5($a$)–5($b$) are drawings illustrating the laser beam scan patterns obtainable by the X-Y laser beam scanning apparatus of the present invention.

The significant advantages provided by the laser scanning apparatus of the present invention may be appreciated by considering specific examples of reflector rotation speed, number of facets on the reflector, the number of facets hit by the laser deflection, and the resultant performance characteristics provided thereby. Illustrated in Tables 1–2 below are such entries corresponding to a wheel shaped reflector as generally illustrated in FIG. 2 with the noted reflector facet and reflector speed entries. Inspection of the entries in these tables shows that very high performance scanning with high resolution may be provided in a number of specific implementations of the present invention operated in mode 2 described above in relation to FIG. 4(b). (Mode 3 described above in relation to FIG. 4(c) will have the same characteristics but with the scan speed reduced by the number of facets in each table.)

in the X direction. Thus, for example, in an application where a conventional video pattern having 368 scan lines were to be created, 368 distinct facets 44 would be provided along the circumference of the reflector 32, each facet being angled at a slightly different angle in the Y direction. In a manner similar to that discussed in relation to FIGS. 4(a) and 4(b), the modulator/deflector 16 shifts the laser beam over some portion of the circumference of the reflector 32 hitting a number of facets to create distinct scan segments illustrated by the numbered segments in FIG. 5(a). For example, the pattern in FIG. 5(a) shows seven segments spaced across the X direction, which number of segments corresponds to the beam being shifted across seven distinct

TABLE 1

| Example | Polygon Speed (RPS) | Number of Facets | Facet Length (in) | Diameter of Polygon (in) | Distance of Facet to Target (in) | Duration Time per Line (sec) | Horizontal Line Length (in) | Dots per Horizontal Line | Number of Facets Hit by Laser Deflection | Lines per Second |
|---|---|---|---|---|---|---|---|---|---|---|
| 1 | 50 | 100 | .050 | 1.625 | 12 | .0014 | 10.5 | 70,000 | 7 | 5,000 |
| 2 | 100 | 100 | .050 | 1.625 | 12 | .000700 | 10.5 | 35,000 | 7 | 10,000 |
| 3 | 150 | 100 | .050 | 1.625 | 12 | .000466 | 10.5 | 23,000 | 7 | 15,000 |
| 4 | 200 | 100 | .050 | 1.625 | 12 | .000350 | 10.5 | 17,000 | 7 | 20,000 |
| 5 | 250 | 100 | .050 | 1.625 | 12 | .000280 | 10.5 | 14,000 | 7 | 25,000 |
| 6 | 300 | 100 | .050 | 1.625 | 12 | .000233 | 10.5 | 11,000 | 7 | 30,000 |
| 7 | 350 | 100 | .050 | 1.625 | 12 | .000200 | 10.5 | 10,000 | 7 | 35,000 |
| 8 | 400 | 100 | .050 | 1.625 | 12 | .000175 | 10.5 | 8,000 | 7 | 40,000 |
| 9 | 450 | 100 | .050 | 1.625 | 12 | .000155 | 10.5 | 7,777 | 7 | 45,000 |
| 10 | 500 | 100 | .050 | 1.625 | 12 | .000140 | 10.5 | 7,000 | 7 | 50,000 |
| 11 | 550 | 100 | .050 | 1.625 | 12 | .000127 | 10.5 | 6,363 | 7 | 55,000 |
| 12 | 600 | 100 | .050 | 1.625 | 12 | .000116 | 10.5 | 5,833 | 7 | 60,000 |
| 13 | 650 | 100 | .050 | 1.625 | 12 | .000107 | 10.5 | 5,384 | 7 | 65,000 |
| 14 | 700 | 100 | .050 | 1.625 | 12 | .000100 | 10.5 | 5,000 | 7 | 70,000 |
| 15 | 750 | 100 | .050 | 1.625 | 12 | .000093 | 10.5 | 4,666 | 7 | 75,000 |

TABLE 2

| Example | Polygon Speed (RPS) | Number of Facets | Facet Length (in) | Diameter of Polygon (in) | Distance of Facet to Target (in) | Duration Time per Line (sec) | Horizontal Line Length (in) | Dots per Horizontal Line | Number of Facets Hit by Laser Deflection | Lines per Second |
|---|---|---|---|---|---|---|---|---|---|---|
| 1 | 50 | 100 | .025 | .810 | 12 | .0028 | 42 | 140,000 | 14 | 5,000 |
| 2 | 100 | 100 | .025 | .810 | 12 | .0014 | 42 | 70,000 | 14 | 10,000 |
| 3 | 150 | 100 | .025 | .810 | 12 | .000933 | 42 | 46,000 | 14 | 15,000 |
| 4 | 200 | 100 | .025 | .810 | 12 | .000700 | 42 | 35,000 | 14 | 20,000 |
| 5 | 250 | 100 | .025 | .810 | 12 | .000560 | 42 | 28,000 | 14 | 25,000 |
| 6 | 300 | 100 | .025 | .810 | 12 | .000466 | 42 | 23,333 | 14 | 30,000 |
| 7 | 350 | 100 | .025 | .810 | 12 | .000400 | 42 | 20,000 | 14 | 35,000 |
| 8 | 400 | 100 | .025 | .810 | 12 | .000350 | 42 | 17,500 | 14 | 40,000 |
| 9 | 450 | 100 | .025 | .810 | 12 | .000311 | 42 | 15,555 | 14 | 45,000 |
| 10 | 500 | 100 | .025 | .810 | 12 | .000280 | 42 | 14,000 | 14 | 50,000 |
| 11 | 550 | 100 | .025 | .810 | 12 | .000254 | 42 | 12,727 | 14 | 55,000 |
| 12 | 600 | 100 | .025 | .810 | 12 | .000233 | 42 | 11,666 | 14 | 60,000 |
| 13 | 650 | 100 | .025 | .810 | 12 | .000215 | 42 | 10,769 | 14 | 65,000 |
| 14 | 700 | 100 | .025 | .810 | 12 | .000200 | 42 | 10,000 | 14 | 70,000 |
| 15 | 750 | 100 | .025 | .810 | 12 | .000186 | 42 | 9,333 | 14 | 75,000 |

Figures 5B, 6:
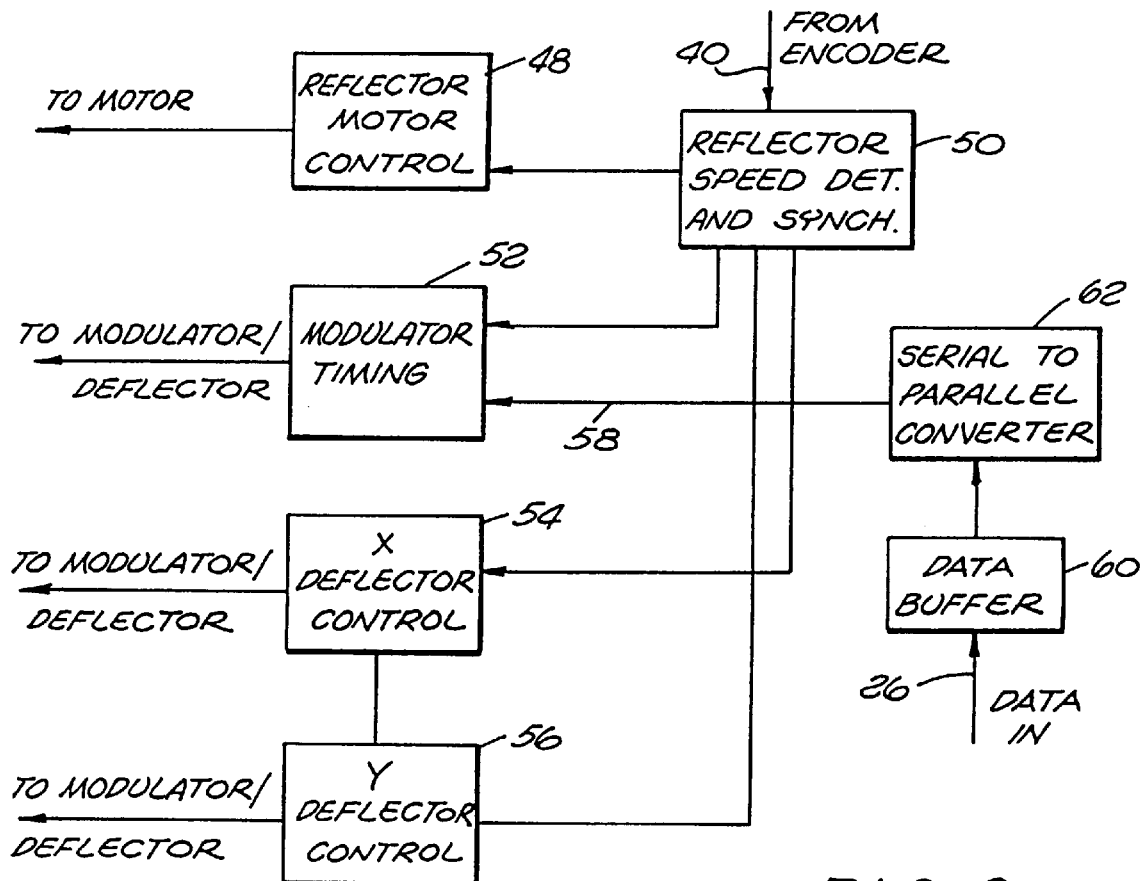
FIG. 6 is a block schematic diagram illustrating a preferred embodiment of the electronic control system of the laser beam scanning apparatus of the present invention.

Referring to FIGS. 5(a) and 5(b), two X-Y laser beam scan patterns are illustrated corresponding to the apparatus of FIG. 2 with the reflective facets angled as illustrated in FIG. 3(b).

Referring first to FIG. 5(a), as indicated by the facet and line numbers along the side of the scanned pattern, each facet of the reflector corresponds to a distinct scan line. That is, each facet 44, as illustrated in FIG. 3(b), is angled at a different angle relative to the Y direction so that a distinct scan line is created by each facet as the reflector 32 is rotated facets. The numbers over each scan line segment correspond to the timing at which each segment is scanned out, in units of the scan period for a single segment. Thus, all the segments labeled 1 are scanned out together as the modulator/deflector 16 shifts the laser beam over the seven facets, creating a portion of horizontal scan lines 1–7. As the reflector rotates across the angular range of a segment, the deflector is cycled at high speed to create the individual scan points indicated by the dots in each segment 1. Although relatively few dots are shown in each segment for illustrative purposes, it will be appreciated that due to the very high cycling speed of the modulator/deflector 16, an extremely large number of individual scan points may be provided in each segment during the rotation of the reflector.

Similarly, the rotation of the reflector through a second scan segment angle generates the seven scan segments labeled 2 in FIG. 5(*a*). It will also be appreciated by inspection of the pattern of FIG. 5(*a*) that as the second set of segments are scanned, the beam has been shifted to the eighth facet and eighth line with the first facet and first line having rotated out of the range of deflection of the laser beam 10. It will thus be appreciated that the X-Y pattern in FIG. 5(*a*) is scanned out in a parallel manner, seven scan lines deep. It will also be appreciated from the upper boxed portion of the pattern in FIG. 5(*a*), that during the initial start up of the scanning apparatus the first six lines of the X-Y pattern will not be fully scanned. This is the case since the first six facets will rotate out of the deflection range of the laser beam before the entire scan angle is traversed. The area in the scan pattern within the dashed box thus corresponds to this incomplete portion of the scan pattern. The missing portion of the scan pattern will, however, be filled in when the bottom of the pattern is reached as the reflector rotates through 360° since the first six facets will enter the deflection range of the laser beam before the final scan line is traced out. Thus, the data corresponding to the dashed portion of the X-Y scan pattern may be stored in a buffer and used to modulate the laser beam during the end of the pattern and the beginning of the next field. Alternatively, data modulation may commence with facet 7 of the reflector with that facet thus corresponding to scan line 1. Alternatively, a space can be provided between the last facet and the first facet with the data signal and the rotation of the deflector synchronized accordingly.

Although the pattern of FIG. 5(*a*) is illustrated for a mode of operation where seven scan lines are scanned in parallel, it will be appreciated that a greater number of facets may be hit by the deflector and hence a greater number of scan lines scanned in parallel. Thus, it will be appreciated that the present invention provides the capability to scan an X-Y pattern out in a very high speed manner. Furthermore, due to the high speed nature of the deflector, a very high degree of resolution may be provided by providing a large number of deflector cycles within each scan segment.

Referring to FIG. 5(*b*), an alternate scan pattern is illustrated corresponding to a second mode of operation of the laser beam scanning apparatus of the present invention. The scan pattern illustrated in FIG. 5(*b*) corresponds to a sequential scanning of lines from the top to bottom of the Y direction. This thus makes the control system compatible with data provided in a conventional raster scan format. This pattern is achieved by synchronizing the modulator/deflector 16 with the rotation of the reflector 32 so that the laser beam is maintained on a single facet as it is traversed across the entire X scan direction. After completion of a scan line the deflector cycles the beam back to the initial position at which time a different facet will have rotated into position. For example, assuming the same seven facet deflection range as discussed in relation to FIG. 5(*a*), the second scan line will correspond to the seventh facet. Similarly, the third scan line corresponds to the 14th facet, etc. as illustrated by the facet and line numbers provided for FIG. 5(*b*). Thus, the angling of the facets about the circumference of reflector 32 in the Y direction is chosen so that every seventh facet provides the desired angular displacement to provide the next scan line. In the mode of operation providing the scan line pattern of FIG. 5(*b*), the X-Y pattern will not be scanned out in parallel as in the case of FIG. 5(*a*), and will be accordingly slower. Nonetheless significant advantages are provided over a conventional system since a mechanically simple configuration is provided which provides relatively high scanning speeds with a high degree of resolution.

It will be appreciated that different combinations of staggering of facet angles relative to the Y direction and different relative speeds of operation of the deflector and the reflector may provide other X-Y patterns. The patterns of FIG. 5(*a*) and FIG. 5(*b*) are presently preferred for most applications, however.

Referring to FIG. 6, a preferred embodiment of the control system 24 is illustrated in block schematic form. As shown, the control system 24 preferably includes a reflector motor control circuit 48 which provides a control signal to the reflector motor to establish a desired motor rotational speed for the specific mode of operation chosen. The motor control circuit in turn receives a feedback signal derived from the encoder signal provided along line 40 to a reflector speed detection and synchronization circuit 50. Through the feedback from the reflector speed detection circuit 50, the motor control circuit 48 may precisely control the desired rotational speed of the motor.

The reflector speed detector and synchronization circuit 50 also derives a synchronization signal corresponding to the specific angular position of the reflector 32 and provides it to modulator timing circuit 52, X deflector control circuit 54 and Y deflector control circuit 56. Circuit 50 may, for example, provide a synchronization signal for each facet as it moves about the circumference of reflector 32. Alternatively, where the laser beam scanning apparatus is operated in a mode wherein the laser beam is maintained on a single facet throughout the deflector range, the circuit 50 may provide a synchronization signal corresponding to a rotation through an entire scan line angle.

Still referring to FIG. 6, the modulator timing circuit 52 receives the synch signal from circuit 50 along with a data signal provided along line 58 to modulate the laser beam in accordance with the specific scan pattern chosen. In the embodiment where the scan pattern is chosen to be one in which the scan lines are scanned in parallel segments, for example, as described above in relation to FIG. 4(*b*) or 5(*a*), the data signal will be provided from data decoding circuitry. For example, in the embodiment illustrated in FIG. 6, the data decoding circuitry includes a data buffer 60 and a serial to parallel converter 62. For example, for a horizontal scanning application, the data buffer 60 will receive externally provided data along line 26 for an entire scan line and provide it to serial to parallel converter 62. Serial to parallel converter 62 in turn provides the buffered data in parallel form, corresponding to the number of scan segments, to the modulator timing circuit 52. Where an X-Y scan pattern is to be provided, the data buffer 60 will receive and buffer data corresponding to the number of scan lines being scanned in parallel. This buffered data in turn is provided to serial to parallel converter 62 which will convert it to a parallel format corresponding to the scan pattern of FIG. 5(*b*).

Still referring to FIG. 6, the X deflector control circuitry 54 receives the reflector synch signal from circuit 50 and synchronizes the deflector with the motion of the reflector 32 in one of the modes described above. The Y deflector control circuitry 56 in turn receives the reflector synch signal from circuit 50 as well as a signal from X deflector control 54 to detect when the laser beam reaches the extreme edges of the horizontal scan line(s) to provide a correcting Y deflection to remove any nonlinearities introduced by the beam optics. In particular, for scanning in the X-Y directions, the Y deflector control circuit 56 will adjust the amount of Y deflection at the extreme portion of the horizontal scan lines in accordance with the horizontal line being scanned.

In applications where the laser beam scanning apparatus of FIG. 2 is used purely for laser beam illumination, the modulator timing circuit 52 as well as the data decoding circuitry 60 and 62, may be dispensed with. Also, for many such applications, the accuracy of the scan lines is less important than for a data provision system in which case the Y deflector control circuitry 56 may also be dispensed with as well as the coupling of the reflector speed detection and synchronization circuit 50 to the X deflector control 54. Of course, it will be appreciated that further modifications and variations in the control circuitry of FIG. 6 may be made in accordance with the specific application of the laser scanning apparatus of the present invention.

Figure 7:
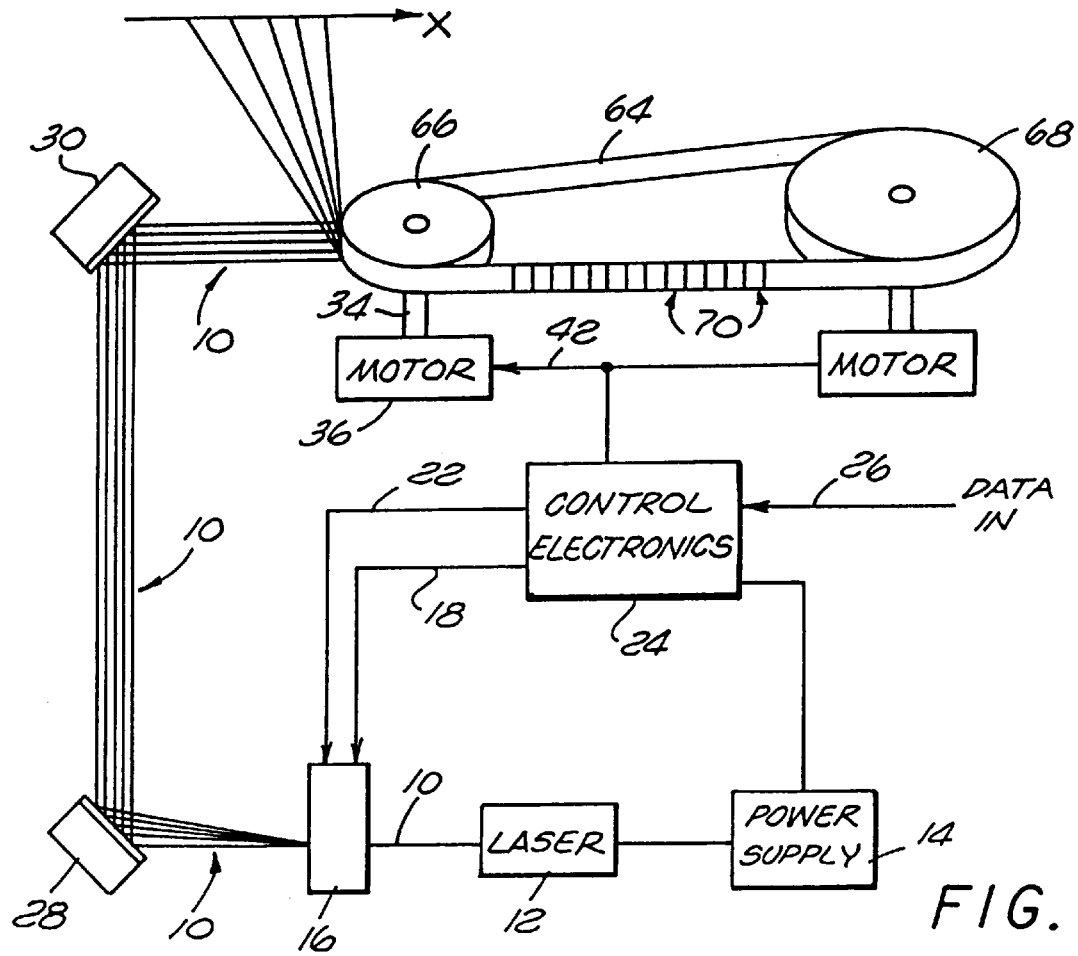
FIG. 7 is a drawing illustrating an alternate embodiment of the laser beam scanning apparatus of the present invention.

Referring to FIG. 7, an alternate embodiment of the laser beam scanning apparatus of the present invention is illustrated. In the embodiment of FIG. 7, the majority of the components of the system correspond to those of FIG. 2, with like numerals being used. In the embodiment of FIG. 7, however, the wheel shaped reflector 32 has been replaced with a belt shaped reflector 64 mounted on first and second pulleys 66, 68, respectively. The belt 64 includes a large number of flat reflective surfaces 70 mounted on the outer surface of the belt. Since the length of the belt 64 is not limited by the angular size of the pulley 66, an arbitrarily large number of facets 70 may be provided. This embodiment is suitable for an application where a very large number of horizontal scan lines are desired for an X-Y scanning pattern. In this case, the length of belt 64 and the number of facets 70 would be chosen to provide the desired number of different angled facets to create the desired number of horizontal scan lines.

Figure 8:
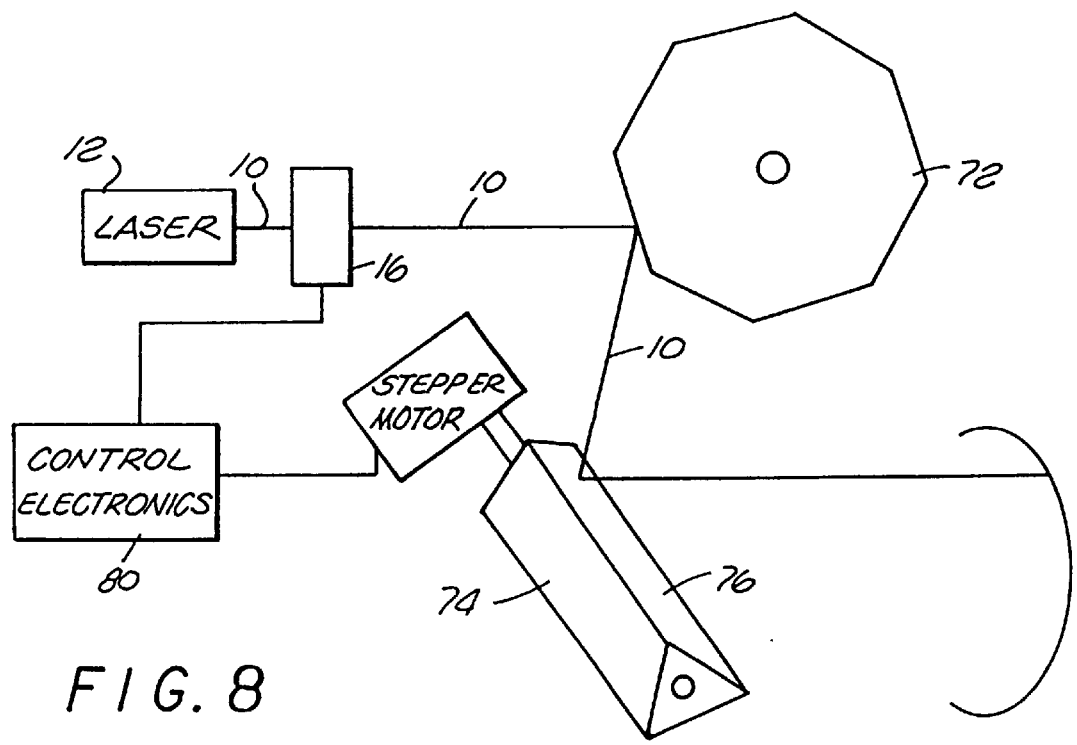
FIG. 8 is a drawing illustrating an alternate embodiment of the X-Y laser beam scanning apparatus of the present invention employing separate X and Y reflectors.

Referring to FIG. 8, an alternate embodiment of the present invention is illustrated for providing an X-Y scan pattern employing two movable reflectors 72, 74. In the embodiment of FIG. 8, a laser beam 10 is provided from laser 12 to modulator/deflector 16 which functions as described in relation to FIG. 2 above. Beam 10 is then provided to the first movable reflector 72 which scans the laser beam 10 in a first X direction in a manner as described above in relation to the apparatus of FIG. 2. The scanned beam 10 is provided to the second movable reflector 74 which has a plurality of elongated reflective sides 76 which receive the laser beam 10 as it is scanned along the horizontal direction. The length direction of the reflective sides 76 thus corresponds to the scan direction provided by first reflector 74. After completion of a horizontal scan line, the second movable reflector 74 is rotated by stepper motor 78 so that reflective surface 76 defines a second horizontal scan line displaced from the first scan line in the Y direction. It will thus be appreciated that the stepping of the second movable reflector through a desired number of discrete angular increments will produce an X-Y scan pattern with a desired number of scan lines.

The modulator/deflector 16 and first movable reflector 72 preferably operate in a horizontal scan mode as described above in relation to FIGS. 4(a)–(c). The synchronization of the first reflector 72 and second reflector 74 may be achieved in combination with modulator/deflector 16 by control electronics 80. While the embodiment of FIG. 8 provides additional mechanical complexity due to the presence of the second movable reflector 74, in some applications, for example, those requiring a very large number of vertical scan lines, the embodiment of FIG. 8 may be preferred.

Figure 9:
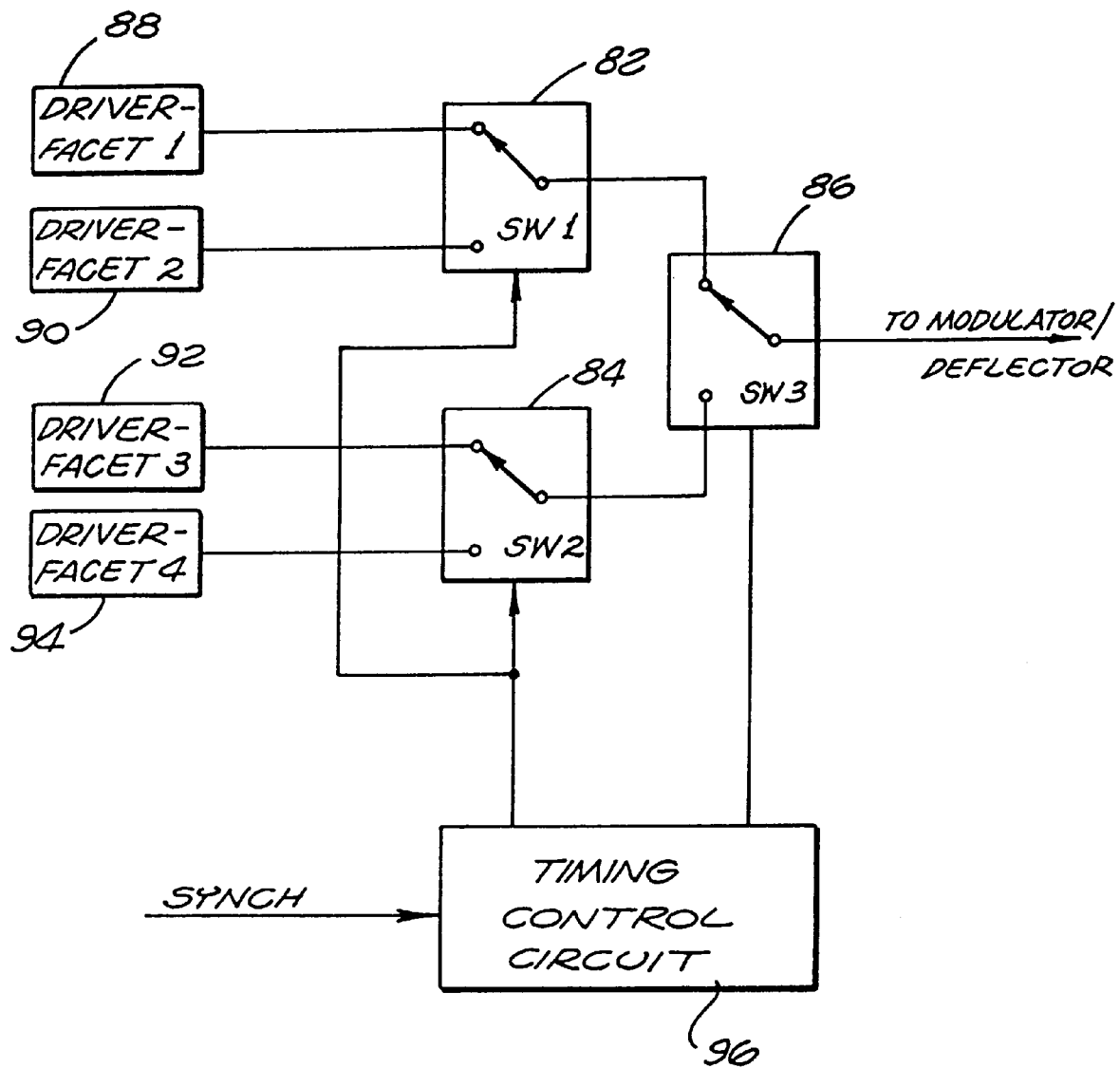
FIG. 9 is a block schematic drawing illustrating a preferred embodiment of a deflector control circuit in accordance with the present invention.

Referring to FIG. 9, a block schematic drawing of a deflector control circuit suitable for use with the above-described embodiments is illustrated. For example, the illustrated deflector control circuit may be suitably employed for deflector control circuit 54, illustrated in FIG. 6. As illustrated, the deflector control circuit employs first, second and third high speed switches 82, 84 and 86, respectively. These three switches 82, 84, and 86 selectively couple four drivers 88, 90, 92 and 94 to the acousto-optic deflector (e.g. deflector 16 illustrated in FIGS. 2, 7 and 8). Drivers 88, 90, 92 and 94 may, for example, be commercially available RF drivers such as those discussed above available from Isoinet Corporation. Each of the drivers 88, 90, 92 and 94 are tuned or preset to a frequency to provide a desired fixed degree of deflection for the laser beam passing through the deflector 16. These predetermined deflection amounts will correspond to the amount of deflection needed to direct the laser beam to four separate facets of the movable reflector (e.g. rotatable polygon 32 in the embodiment illustrated in FIG. 2).

Due to the very fast response time of commercially available acousto-optic modulators (presently in the several nanosecond range) and the high speed switching action of switches 82, 84 and 86, the circuit illustrated in FIG. 9 may effectively jump the laser beam in discrete steps from facet to facet at high speed and in a precise manner. The timing of the stepping of the beam from facet to facet, via the activation of switches 82, 84 and 86, is controlled by timing control circuit 96. As illustrated in FIG. 9, timing control circuit 96 preferably receives the SYNCH signal from circuit 50 (shown in FIG. 6), which provides an indication of the rotational speed of the reflector. This SYNCH signal is employed by timing control circuit 96, along with a higher speed clock signal (which may be externally provided or generated within circuit 96), to control the switching of switches 82, 84 and 86 at a high speed relative to the angular speed of the rotating deflector.

Thus, for example, when a first signal (e.g. high) is applied to switch 82 and switch 86, corresponding to the switch positions indicated in FIG. 9, the driver signal from driver 88 will be applied to the acousto-optic modulator to direct the laser beam to a first facet. Upon the signal to switch 82 going low, the switch connects driver 90, thereby switching the beam to facet number 2. Next, the signal applied to switch 86 is driven low while the signal to switch 84 is high, activating driver 92 and switching the beam to facet number 3. Finally, when the signal to switch 84 is low the driver 94 is connected to the acousto-optic modulator thereby switching the beam to facet number 4.

It will, of course, be appreciated that four drivers corresponding to switching between four facets is illustrated purely for convenience in FIG. 9 and a greater or smaller number of drivers, corresponding to stepping of the beam between a greater or smaller number of facets, may equally be employed.

While the deflector control circuit illustrated in FIG. 9, employing a discrete switching of predetermined driver signals to the acoustic deflector is presently preferred, it will be appreciated by those skilled in the art that an analog deflector driver circuit may equally be employed. Such an analog circuit would provide a suitable analog ramp signal to a tunable driver to thereby sweep the laser beam continuously across a desired number of facets. For example, a linear sawtoothed-type ramp signal may be employed. Also, other linear or even nonlinear analog ramp signals may be employed to rapidly move the beam from facet to facet. Since the facets are optically decoupled no beam distortion will occur as the beam is swept between adjacent facets.

Figure 10:
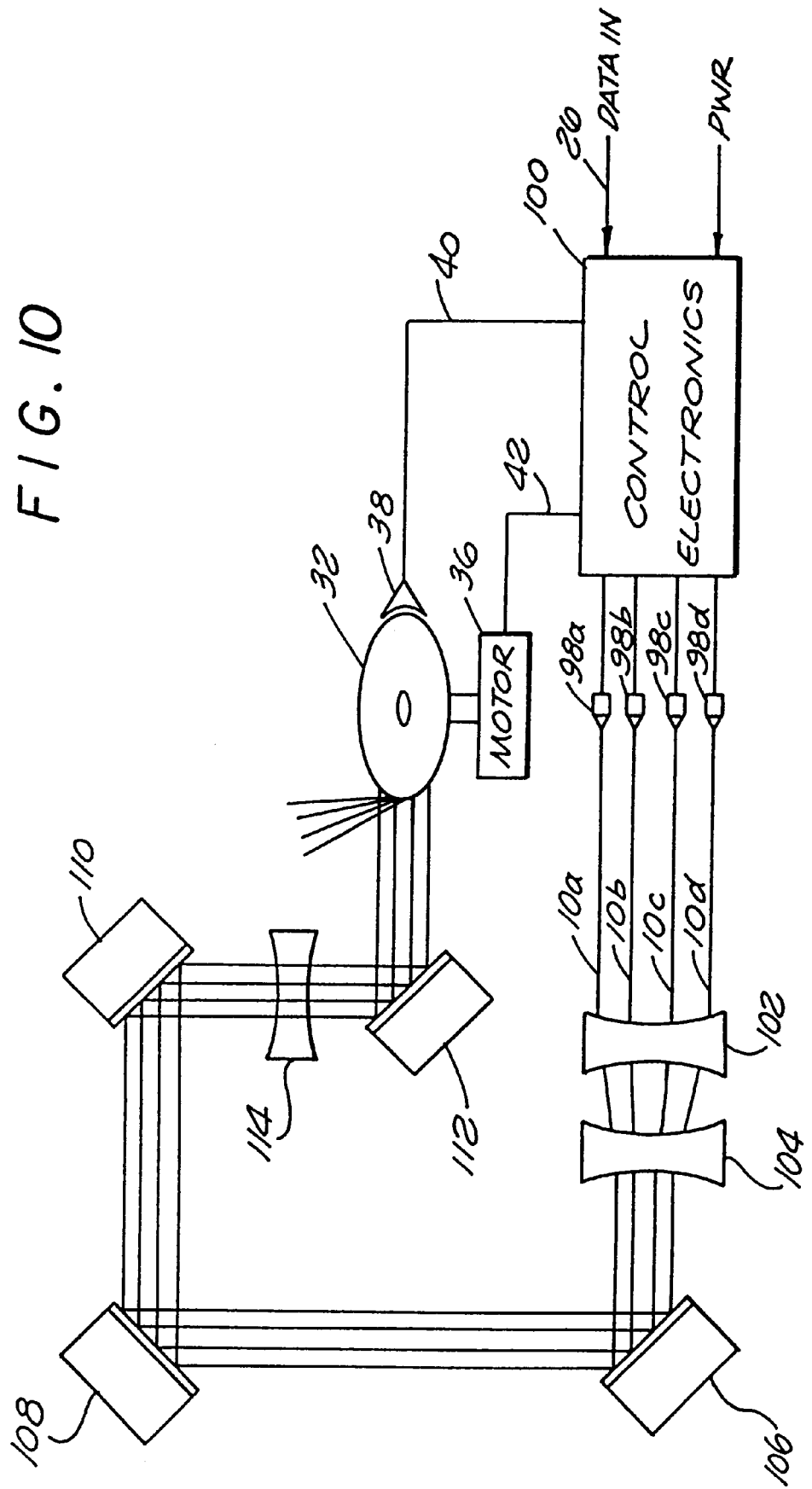
FIG. 10 is a drawing illustrating an alternate embodiment of the laser beam scanning apparatus of the present invention employing discrete diode lasers.

Referring to FIG. 10, an alternate embodiment of the laser beam scanning apparatus of the present invention is illustrated employing multiple discrete diodes in place of a single laser as illustrated in the previously described embodiments. As shown in FIG. 10, a rotatable multifaceted polygon 32 may be employed as in the case of the previously described embodiments. This, in turn, is rotated by a motor 36 at a precise speed monitored via encoder 38, also in a manner as described above. In place of a single laser beam 10 as described above, however, plural laser beams 10a, 10b, 10c, etc. are provided from discrete laser diodes 98a, 98b, 98c, etc. As will be described in more detail below in relation to FIG. 11, the individual laser diodes 98a–98e are controlled separately by control electronics 100. Although four laser diodes 98a–98d are illustrated in FIG. 10, it will be appreciated that fewer laser diodes or a greater number nay be employed as desired for the specific application.

As shown in FIG. 10, the parallel laser beams 10a–10d provided from laser diodes 98a–98d are focused and converged through optical elements 102, 104, which may be conventional high quality optical lenses. Depending upon the constraints imposed by size limitations of the specific environment, the parallel laser beams are directed through an optical path defined by mirrors 106, 108, 110 and 112, and through a third optical element 114 to further converge and focus the beams, before providing them to rotating reflector 32. The four parallel laser beams 10a–10d are directed from mirror 112 in a compact substantially parallel pattern onto reflector 32 so as to individually strike four separate respective facets. The beams are then reflected from their separate facets in a direction towards the desired target in a manner as indicated generally in FIG. 10.

Since four discrete laser beams 10a–10d are provided by the separate laser diodes 98a–98d, will be appreciated that whereas the laser beam described previously was swept across plural facets, in the present embodiment such a sweeping action is not required and, hence, the use of an acousto-optic deflector may be dispensed with. Furthermore, since currently available laser diodes may be switched on and off at very high speeds, the individual laser beams 10a–10d may be modulated by turning the diodes 98a–98d on and off, rather than by employing a acousto-optic modulator in the respective optical paths to modulate the beam. Alternatively, modulation may be achieved by plural such modulators in each of the parallel optical paths illustrated in FIG. 10 if so desired. In either case, it will be appreciated that by independently activating or modulating laser beams 10a–10d in synchronism with the rotation of the plural facets on rotating reflector 32, a scan pattern may be created in a first scan direction in the same manner as described above in the case of the high speed sweeping of a single beam across plural facets. Similarly, additional scan directions may be added in a manner similar to that described above.

Figure 11:
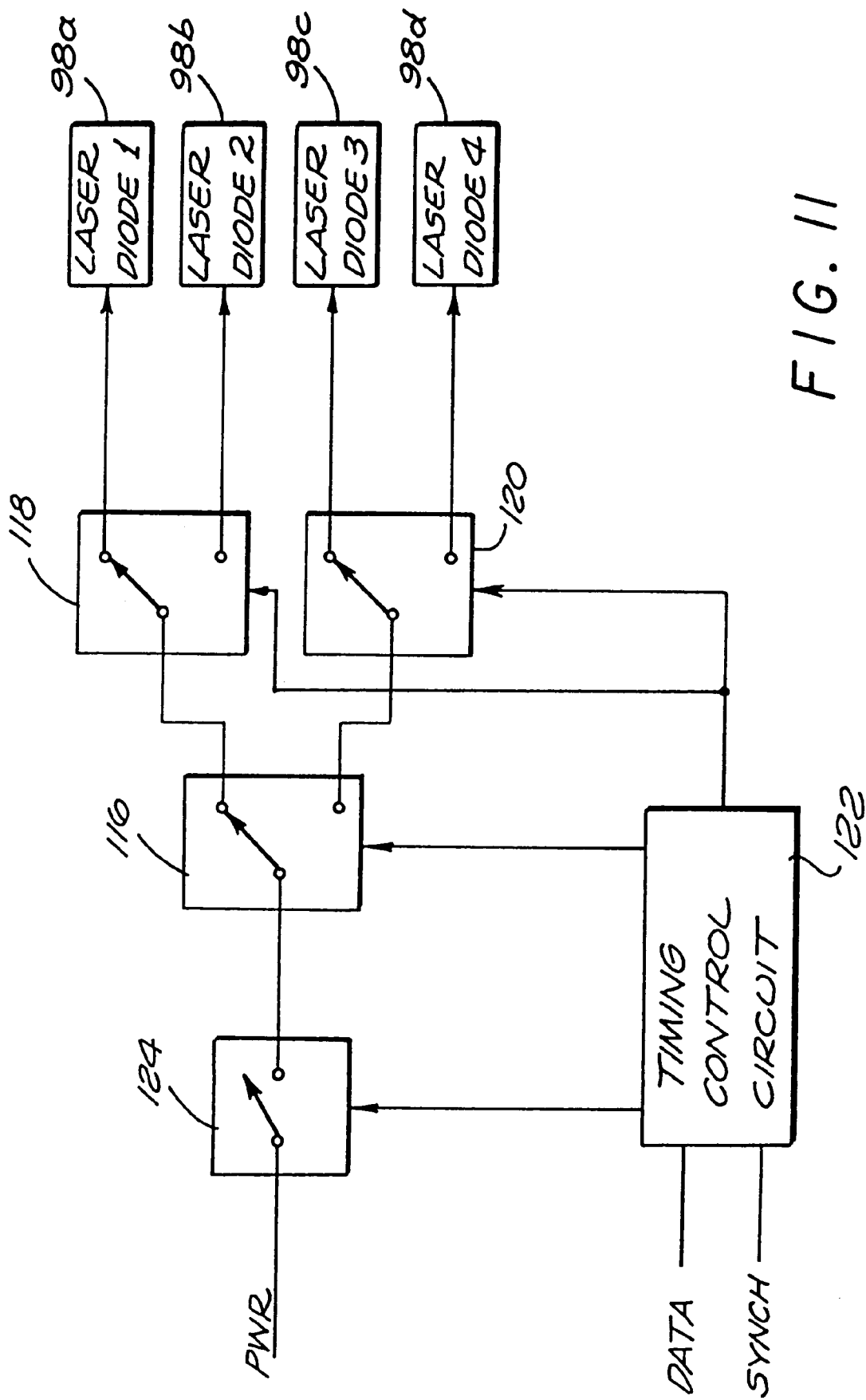
FIG. 11 is a block schematic drawing illustrating a control circuit for the embodiment of FIG. 10.

Referring to FIG. 11, a block schematic diagram of a laser diode driver circuit incorporated in the control electronics 100 of FIG. 10, is illustrated. The control circuit illustrated in FIG. 11 is adapted to successively switch laser diodes 98a–98d on and off at high speed in accordance with a SYNCH signal related to the angular speed of the rotating reflector 32 derived from encoder 38 and in response to a DATA signal externally provided along line 26. The successive activation of the laser diodes 98a–98d so as to successively illuminate four respective facets on rotating reflector 32 is accomplished in a manner analogous to the switching operation of the circuit described in relation to FIG. 9 above.

More specifically, the first, second and third switches 116, 118, and 120 are switched on and off by timing control circuit 122 so as to provide power successively to laser diodes 98a–98d. Additionally, a fourth switch 124 is further controlled by timing control circuit 122 in response to the DATA signal so as to modulate the power on and off to an individual laser diode as it is switched on to thereby encode data into the laser beam applied to the respective facet. Accordingly, it will be appreciated that the various scan patterns, described above in relation to the previous embodiments, may be achieved without employing an acousto-optic modulator/deflector by successively activating independent laser diodes in accordance with the circuit illustrated in FIG. 11. Alternatively, a separate switch or a separate modulator may be provided for each of the laser diodes 98a–98d so as to allow parallel illumination of the respective facets in a manner which may be independently modulated in accordance with the DATA signal.

While the foregoing detailed description of the present invention has been made in conjunction with specific embodiments, and specific modes of operation, it will be appreciated that such embodiments and modes of operation are purely for illustrative purposes and a wide number of different implementations of the present invention may also be made. Accordingly, the foregoing detailed description should not be viewed as limiting, but merely illustrative in nature.

It will be appreciated from the foregoing that the present invention has utility in a variety of applications where it is necessary to scan a laser beam, in one or more directions, accurately and at high speed. Such applications include laser printers, optical disc read/write systems, laser based displays, laser imaging, laser phototypesetting, fiber optic networking systems and other applications.

What is claimed is:

1. A method for scanning one or more beams of light across an arcuate range, employing a reflector having a plurality of reflective facets, the method comprising the steps of:

dividing the arcuate range into a plurality of sub-ranges;

providing one or more beams of light, each of said light beams having a diameter substantially equal to or less than the width of a single reflective facet;

moving the reflector at a predetermined angular speed; and directing the one or more beams of light to plural facets of the reflector while angularly moving the reflector and scanning each of the beams of light reflected off of the plural facets through a sub-range to create a plurality of partial scan patterns and creating an uninterrupted scan pattern across the entire arcuate range comprised of the plural partial scan patterns.

2. A method as set out in claim 1, wherein said step of directing comprises directing plural light beams individually to each of plural facets of the reflector.

3. A method as set out in claim 1, wherein said step of directing comprises shifting a single light beam successively between facets of the reflector.

* * * * *